(12) United States Patent
Kwon

(10) Patent No.: US 8,466,620 B2
(45) Date of Patent: Jun. 18, 2013

(54) BI-COLOR LICENSE PLATE FRAME

(76) Inventor: Young Chul Kwon, Granada Hills, CA (US)

( * ) Notice: Subject to any disclaimer, the term of this patent is extended or adjusted under 35 U.S.C. 154(b) by 288 days.

(21) Appl. No.: 12/902,488

(22) Filed: Oct. 12, 2010

(65) Prior Publication Data

US 2011/0084610 A1 Apr. 14, 2011

Related U.S. Application Data

(60) Provisional application No. 61/250,786, filed on Oct. 12, 2009.

(51) Int. Cl.
*B60Q 1/14* (2006.01)
(52) U.S. Cl.
USPC .............................................. 315/77; 315/80
(58) Field of Classification Search
USPC .................... 40/204, 209, 442, 591; 362/497, 362/499, 511, 802, 806; 315/77, 80, 82, 149
See application file for complete search history.

(56) References Cited

U.S. PATENT DOCUMENTS

| | | | | |
|---|---|---|---|---|
| 5,408,772 A | * | 4/1995 | Pettyjohn | 40/204 |
| 6,526,680 B1 | * | 3/2003 | Yu | 40/204 |
| 8,274,226 B1 | * | 9/2012 | Sikora et al. | 315/77 |
| 2006/0203502 A1 | * | 9/2006 | Stevens et al. | 362/497 |
| 2006/0213100 A1 | * | 9/2006 | McCann | 40/591 |

* cited by examiner

*Primary Examiner* — Tung X Le
(74) *Attorney, Agent, or Firm* — Chanmin Park

(57) ABSTRACT

A bi-color license plate frame, for surrounding a license plate of a vehicle, comprises a rectangular body comprising an aperture that is adapted to show a license plate, and a wall defining a hollow frame space inside the wall, a plurality of light-emitting elements contained in the frame space, and a controller that is electrically connected to the light-emitting elements and that controls the light intensity of the light-emitting elements according to the braking status of the vehicle. The wall of the rectangular body is translucent to the light of the light-emitting elements, and comprises a light diffusion layer, whereby surface illumination is provided when the light-emitting elements are turned on. Bi-color may include metal look and color emitted by the light-emitting elements, or red or black color of the light-diffusion layer and color emitted by the light-emitting elements.

13 Claims, 6 Drawing Sheets

US 8,466,620 B2

BI-COLOR LICENSE PLATE FRAME

CROSS REFERENCE TO RELATED APPLICATION(S)

This application claims priority on Provisional Application No. 61/250,786 filed on Oct. 12, 2009.

BACKGROUND OF THE INVENTION

This invention is related to a bi-color license plate frame. More particularly, the invention is related to a bi-color license plate frame, which provides a surface illumination for the license plate frame. License plate frames are used by most drivers to provide decorative effect around a license plate. Prior art license plate frames provide only passive and non-changing decorative effect. An active, advanced license plate frame has long been in need.

SUMMARY OF THE INVENTION

The present invention contrives to solve the disadvantages of the prior art.

An objective of the invention is to provide a bi-color license plate frame, which provides a surface illumination for the license plate frame.

Another objective of the invention is to provide a surface illumination for the license plate frame, which indicates the state of brake.

To achieve the above objectives, the present invention provides a bi-color license plate frame, for surrounding a license plate of a vehicle, comprising a rectangular body comprising an aperture that is adapted to show a license plate, and a wall defining a hollow frame space inside the wall; a plurality of light-emitting elements contained in the frame space; and a controller that is electrically connected to the light-emitting elements and that controls the light intensity of the light-emitting elements. The wall of the rectangular body is translucent to the light of the light-emitting elements, and comprises a light diffusion layer, whereby surface illumination is provided when the light-emitting elements are turned on.

The controller comprises an ambient light sensor that measures the intensity of ambient light, and a brake sensor that is adapted to receive braking signal from the vehicle. The controller controls the light intensity of the light-emitting elements according to the received braking signal.

When the ambient light sensor indicates that it is night time and the brake sensor indicates that that the brake is not stepped on, the controller set the light intensity at a first magnitude. When the ambient light sensor indicates that it is night time and the brake sensor indicates that that the brake is stepped on, the controller set the light intensity at a second magnitude. The first magnitude is lower than the second magnitude.

The light diffusion layer is made of resin, wherein the resin comprises acrylonitrile butadiene styrene (ABS), or poly methyl methacrylate (PMMA). The resin of the light diffusion layer is dyed in red or black color.

The wall of the rectangular body may further comprise a silver nano painting layer. The thickness of the silver nano painting layer is in the range of 3~5 μm.

Alternatively, the wall of the rectangular body may further comprise a metal coating layer, wherein the degree of translucency is controlled with the grains of the metal coating layer.

The bi-color license plate frame further comprises a printed circuit board on which the light-emitting elements are installed, wherein the light-emitting elements comprise light-emitting diodes. The light emitting diodes have a light emitting angle greater than one hundred ten degree.

The printed circuit board comprises a heat conducting plate that is adapted to contact the vehicle, whereby heat generated by the light-emitting diodes is dissipated to the vehicle.

The light diffusion area may comprise a plurality of projections that divert light rays from the light-emitting elements.

The bi-color license plate frame further comprises a wire that is adapted to be connected to a wiring harness of the vehicle, and a fastener that is adapted to fasten the rectangular body to the vehicle and that has a space for passage of the wire. The fastener comprises a threaded screw that comprises a half-cylindrical body. Alternatively, the fastener comprises a cap that fits into a hole provided on the rectangular body.

The advantages of the present invention are: (1) unique appearance of a license plate frame is possible; (2) the bi-color license plate frame adds safety of driving by functioning as a brake light.

The invention is explained in detail with the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Every single automobile has at least one license plate. Such license plate is fixed to front or rear side of the automobile with a license plate frame. Therefore, the license plate frame goes with an automobile everywhere. Due to its omnipresence, the license plate frame has been used for many purposes. In this invention, the license plate frame may include one or more illuminating devices. For example, the license plate frame may include a plurality of light-emitting diodes (LEDs) The license plate frame may include a diffusing surface for diffusing light from the illuminating devices, which may make a surface illumination out of a point light from the illuminating device by diffusing the lights from the illuminating device. The diffusing surface may include a resin including acrylonitrile, butadiene styrene (ABS) (chemical formula (C8H8) (C4H6)(C3H3N)), which is a common thermoplastic used to make light, rigid, molded products such as piping (for example plastic pressure pipe systems), musical instruments (most notably recorders and plastic clarinets), golf club heads (used for its good shock absorbance), automotive body parts, wheel covers, enclosures, protective headgear, buffer edging for furniture and joinery panels, Thule boxes, airsoft BBs and toys, including Lego bricks.

Dyes can be added to the ABS to obtain different colors of light diffusion. In one embodiment, the ABS may be reddish. In certain embodiments of the invention, the dyed ABS may be coated with metal, which may look metallic in a daylight, and translucent to the lights at night. The degree of translucency may be controlled with the grains of metal coating.

The ABS bi-color license plate frame may have metallic chrome coating. Alternatively, the bi-color license plate frame may include other kinds of translucent plastic instead of natural ABS.

One of the translucent plastic may have a black color under daylight, and translucent enough to pass lights at night.

Still alternatively, the bi-color license plate frame may include a plastic having a silver nano painting, preferably about 4 μm thick, producing a plurality of colors.

Figure 3:
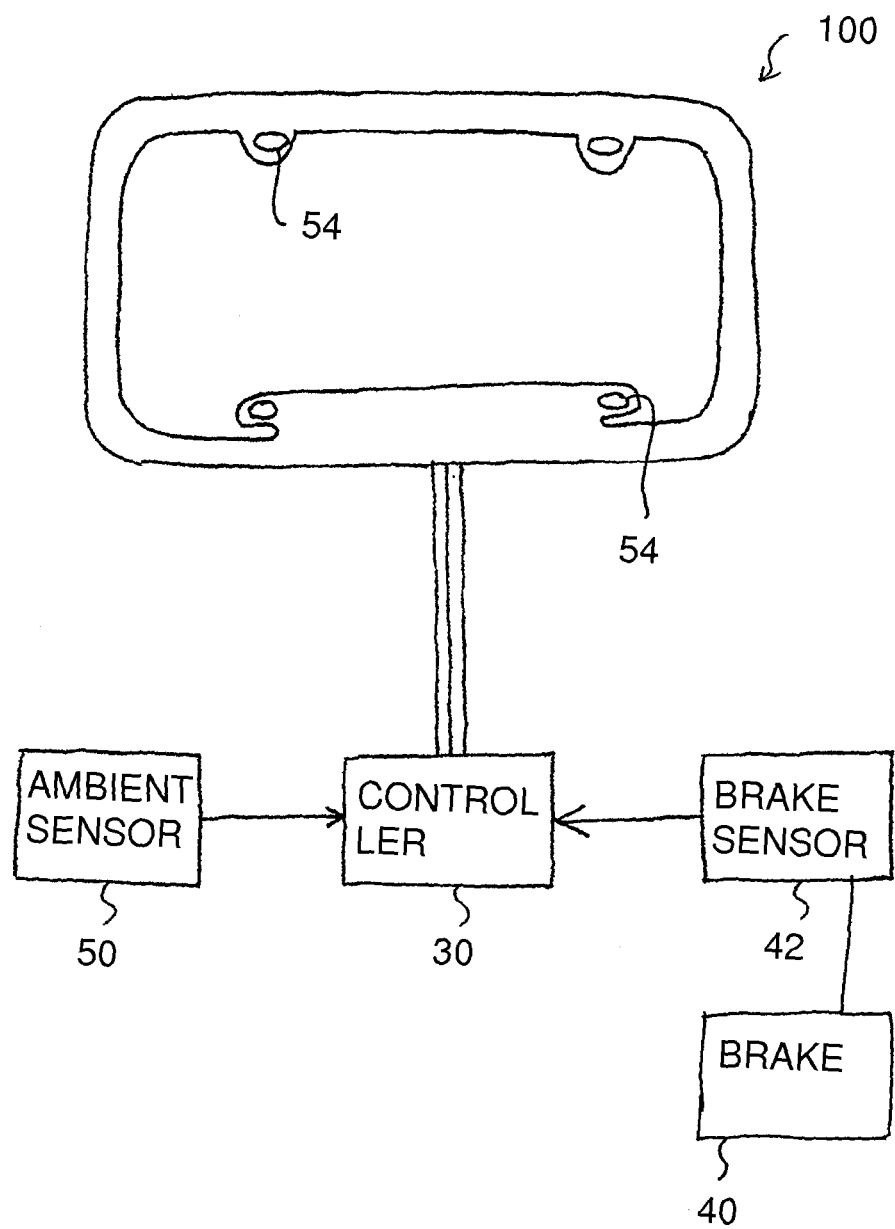
FIG. 3 is a block diagram showing a system for bi-color license plate according to another embodiment of the invention.

The plurality of illuminating devices may be electrically connected to a controller, which controls the brightness of the illuminating devices as shown in FIG. 3.

The controller may get inputs from a brake system of the automobile. The brightness of the illuminating devices can be controlled by the status of the brake system.

In a certain embodiment of the invention, the brightness is nil when it is a daytime and the brake is not stepped on, which renders the bi-color license plate frame to look opaque and metallic. At night, however, the brightness is set to be a first magnitude when the brake is not stepped on, and to be a second magnitude when the brake is stepped on. The first magnitude may be lower than the second magnitude. Thus, the bi-color license plate frame is reddish at night, and whenever the driver steps on the brake the bi-color license plate frame go much more reddish, in order to warn the other drivers in the following cars.

As shown in FIG. 3, the bi-color license plate frame may include a light sensor that senses the ambient light to determine if it is nighttime or daytime. Therefore, the controller may receive inputs from the brake system and the light sensor, and determine when to turn on or off the illuminating devices and when to turn on them at the first magnitude or the second magnitude.

In a certain embodiment of the invention, the bi-color illuminated display may comprises: a metal look layer; one or more illuminating elements; a light diffusion layer that diffuses light from the illuminating elements, wherein the metal look layer passes light from the illuminating elements; and a controller for controlling switching on or off and brightness of the illuminating elements.

Figure 1:
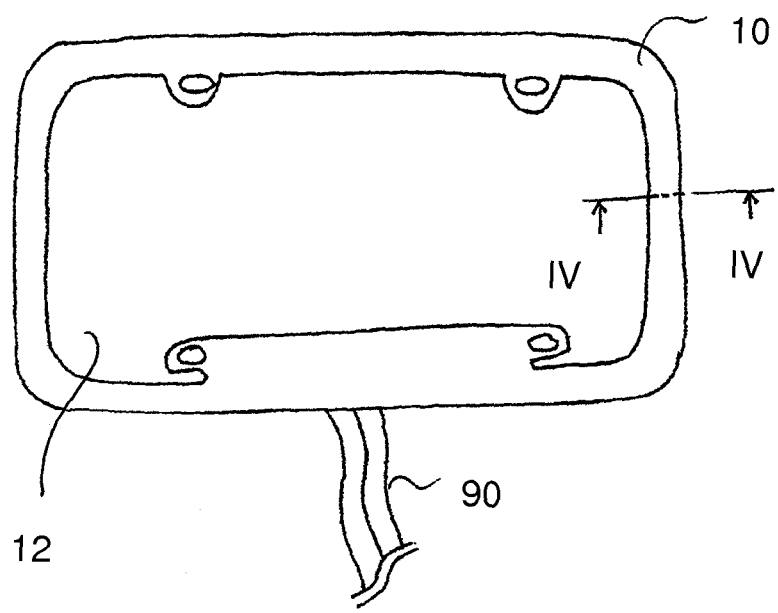
FIG. 1 is a perspective view showing a bi-color license plate according to an embodiment of the invention.
Figure 2:
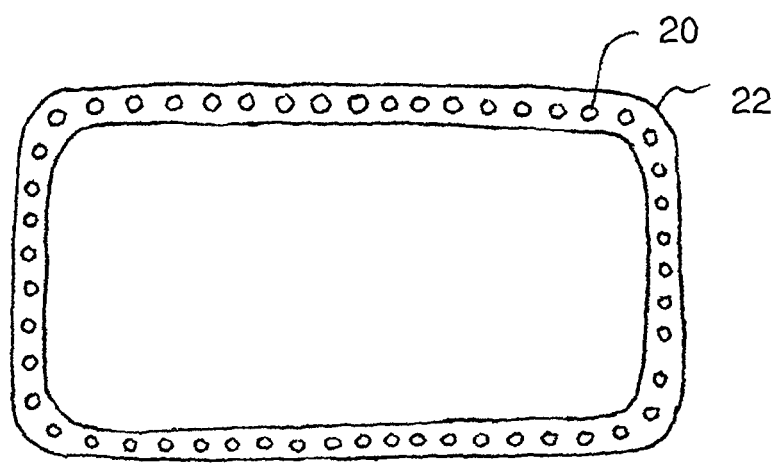
FIG. 2 is a top plan view of a circuit board with a plurality of LEDs of the bi-color license plate of FIG. 1.
Figure 4:
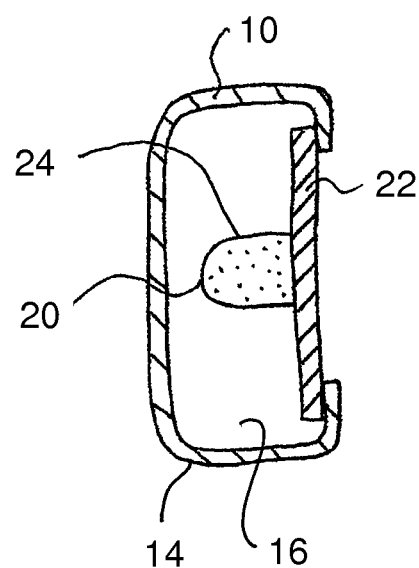
FIG. 4 is a cross-sectional view along line IV-IV of FIG. 1.

FIGS. 1 and 4 show a bi-color license plate frame 100, for surrounding a license plate of a vehicle, comprising a rectangular body 10 that comprising an aperture 12 that is adapted to show a license plate, and a wall 14 defining a hollow frame space 16 inside the wall 14; a plurality of light-emitting elements 20 contained in the frame space 16; and a controller 30 (refer to FIG. 3) that is electrically connected to the light-emitting elements 20 and that controls the light intensity of the light-emitting elements 20.

In FIG. 3, a system for the bi-color license plate frame 100 is illustrated. A brake 40 may be a part of an automobile. The controller 30 is connected with an ambient light sensor 50 that measures the intensity of ambient light, and a brake sensor 42 that is adapted to receive braking signal from the vehicle. The controller 30 controls the light intensity of the light-emitting elements 20 according to the received braking signal. The controller 30 receives necessary information from the brake 40 and the ambient light sensor 50 to determine ON or OFF and brightness of the illuminating device 20.

When the ambient light sensor 50 indicates that it is night time and the brake sensor 42 indicates that that the brake is not stepped on, the controller 30 sets the light intensity at a first magnitude. When the ambient light sensor 50 indicates that it is night time and the brake sensor 42 indicates that that the brake is stepped on, the controller 30 sets the light intensity at a second magnitude. The first magnitude is lower than the second magnitude.

FIG. 4 shows that the bi-color license plate frame 100 further comprises a printed circuit board (PCB) 22 on which the light-emitting elements 20 are installed, wherein the light-emitting elements comprise light-emitting diodes (LED) 24. The number of LEDs 24 can be determined by desired brightness. In this embodiment, the bi-color license plate frame 100 includes 84 LEDs in order to obtain a surface illumination. The LED 24 and the PCB 22 are enclosed by the wall 14, and housed in the hollow frame space 16.

Figure 6:
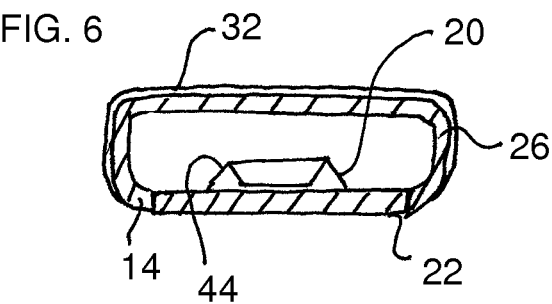
FIG. 6 is a cross-sectional view showing silver nano paint layer.

As shown in FIG. 6, the wall 14 of the rectangular body is translucent to the light of the light-emitting elements, and comprises a light diffusion layer 26, whereby surface illumination is provided when the light-emitting elements 20 are turned on. The light diffusion layer 26 is made of resin, wherein the resin comprises acrylonitrile butadiene styrene (ABS), or poly methyl methacrylate (PMMA), or Lexan™ depending on strength and durablility, etc that are required. The resin of the light diffusion layer is dyed in red or black color. The wall 14 of the rectangular body further comprises a silver nano painting layer 32. The thickness of the silver nano painting layer 32 is in the range of 3~5 μm.

Figure 7:
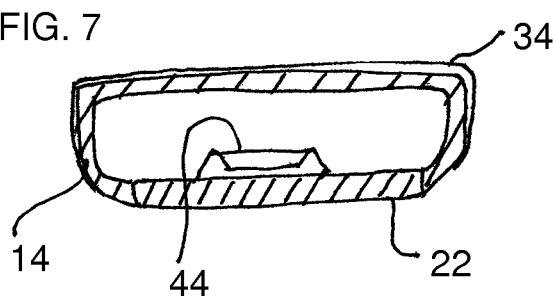
FIG. 7 is a cross-sectional view showing metal coating layer.

FIG. 7 shows that the wall 14 of the rectangular body may further comprise a metal coating layer 34, wherein the degree of translucency is controlled with the grains of the metal coating layer 34.

Figure 5:
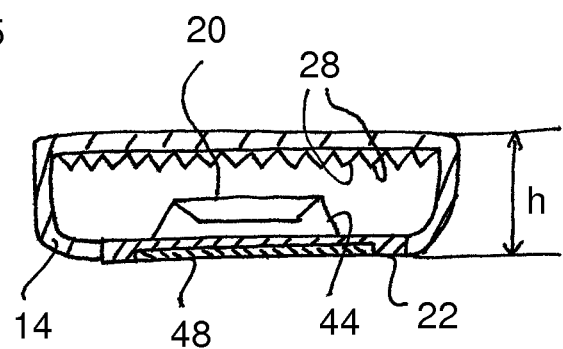
FIG. 5 is a cross-sectional view showing low profile LED and tooth-shaped light diffusion layer.

FIGS. 5~7 show that the light emitting element 20 comprises a low profile and wide angle light emitting diode 44 that has a light emitting angle greater than one hundred ten degree. The use of low profile LEDs 44 helps to reduce the height h of the frame to 11 mm.

FIG. 5 shows that the printed circuit board 22 comprises a heat conducting plate 48 that is adapted to contact the vehicle, whereby heat generated by the light-emitting diodes 44 is dissipated to the vehicle.

Referring FIG. 5, the light diffusion layer may comprise a plurality of projections 28 that divert light rays from the light-emitting elements 20.

Referring back to FIG. 1, the bi-color license plate frame 100 further comprises a wire, or a plurality of leads 90 for electrical connection that are adapted to be connected to a wiring harness of the vehicle. The frame 100 comprises four installation holes 54 that are used in installing the frame to a vehicle.

Figure 8:
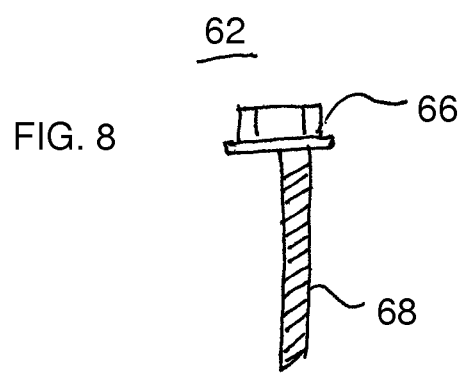
FIG. 8 is an elevation view of a half-cylindrical screw.
Figure 9:
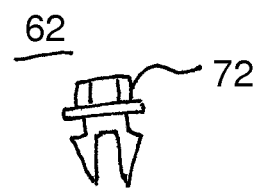
FIG. 9 is an elevation view showing a cap having bolt-head shape.

FIGS. 8 and 9 show a fastener 62 that is adapted to fasten the rectangular body 10 to the vehicle and that has a space 64 for passage of the wire 90. FIG. 8 shows that the fastener comprises a threaded screw 66 that comprises a half-cylindrical body 68. Alternatively, FIG. 9 shows that the fastener comprises a cap 72 that fits into the hole 54 provided on the rectangular body 10. One of the holes 54 is used to insert the wire 90 through it and the cap 72 has a shape of a bolt head and covers the hole 54 to provide same appearance as three other screws that are used to fix the frame 100.

The bi-color license plate frame according to the invention may be adapted to be used for automobiles including cars and motorcycles.

While the invention has been shown and described with reference to different embodiments thereof, it will be appreciated by those skilled in the art that variations in form, detail, compositions and operation may be made without departing from the spirit and scope of the invention as defined by the accompanying claims.

The invention claimed is:

1. A bi-color license plate frame, for surrounding a license plate of a vehicle, comprising:
   a) a rectangular body comprising an aperture that is adapted to show the license plate, and a wall defining a hollow frame space inside the wall;
   b) a plurality of light-emitting elements contained in the frame space; and
   c) a controller that is electrically connected to the light-emitting elements and that controls the light intensity of the light-emitting elements;
   wherein the wall of the rectangular body is translucent to the light of the light-emitting elements, and comprises a light diffusion layer, whereby surface illumination is provided when the light-emitting elements are turned on, wherein the controller comprises an ambient light sensor that measures the intensity of ambient light, wherein the controller further comprises a brake sensor that is adapted to receive braking signal from the vehicle, wherein the controller controls the light intensity of the light-emitting elements according to the received braking signal, wherein when the ambient light sensor indicates that it is night time and the brake sensor indicates that that the brake is not stepped on, the controller set the light intensity at a first magnitude, wherein when the ambient light sensor indicates that it is night time and the brake sensor indicates that that the brake is stepped on, the controller set the light intensity at a second magnitude, wherein the first magnitude is lower than the second magnitude.

2. The bi-color license plate frame of claim 1, wherein the light diffusion layer is made of resin, wherein the resin comprises acrylonitrile butadiene styrene, or poly methyl methacrylate.

3. The bi-color license plate frame of claim 2, wherein the resin of the light diffusion layer is dyed in red or black color.

4. The bi-color license plate frame of claim 1, wherein the wall of the rectangular body further comprises a silver nano painting layer.

5. The bi-color license plate frame of claim 4, wherein the thickness of the silver nano painting layer is in the range of 3~5 μm.

6. The bi-color license plate frame of claim 1, wherein the wall of the rectangular body further comprises a metal coating layer, wherein the degree of translucency is controlled with the grains of the metal coating layer.

7. The bi-color license plate frame of claim 6, further comprising a printed circuit board on which the light-emitting elements are installed, wherein the light-emitting elements comprise light-emitting diodes.

8. The bi-color license plate frame of claim 7, wherein the light emitting diodes have a light emitting angle greater than one hundred ten degree.

9. The bi-color license plate frame of claim 8, wherein the printed circuit board comprises a heat conducting plate that is adapted to contact the vehicle, whereby heat generated by the light-emitting diodes is dissipated to the vehicle.

10. The bi-color license plate frame of claim 9, wherein the light diffusion layer comprises a plurality of projections that divert light rays from the light-emitting elements.

11. The bi-color license plate frame of claim 10, further comprising a wire that is adapted to be connected to a wiring harness of the vehicle, and a fastener that is adapted to fasten the rectangular body to the vehicle and that has a space for passage of the wire.

12. The bi-color license plate frame of claim 11, wherein the fastener comprises a threaded screw that comprises a half-cylindrical body.

13. The bi-color license plate frame of claim 11, wherein the fastener comprises a cap that fits into a hole provided on the rectangular body.

* * * * *